United States Patent [19]

Curti et al.

[11] Patent Number: 4,819,449

[45] Date of Patent: Apr. 11, 1989

[54] CLOSED LOOP SYSTEM FOR MAKING ICE CONFECTIONS HAVING A HOLDING STICK EMBEDDED THEREIN

[75] Inventors: Carlo Curti; Luciano Cattani, both of Milan, Italy

[73] Assignee: Sauer S.p.A., Milan, Italy

[21] Appl. No.: 100,608

[22] Filed: Sep. 24, 1987

[51] Int. Cl.[4] .................................................. A23G 9/14
[52] U.S. Cl. ..................................... 62/345; 425/126.2; 425/259
[58] Field of Search ................. 62/345; 425/99, 126 S, 425/259, 447

[56] References Cited

U.S. PATENT DOCUMENTS

| | | | |
|---|---|---|---|
| 2,884,875 | 5/1959 | Rasmusson | 62/345 X |
| 4,335,583 | 6/1982 | Billett | 62/345 |
| 4,352,830 | 10/1982 | Billett et al. | 62/345 X |
| 4,530,214 | 7/1985 | Ellsworth et al. | 62/345 X |
| 4,546,615 | 10/1985 | Gram | 425/126 S X |

Primary Examiner—William E. Tapolcai
Attorney, Agent, or Firm—Browdy and Neimark

[57] ABSTRACT

In a closed loop system for making ice confections having a holding stick embedded therein, there are provided: dies for the ice confections, rigid plates each supporting plural rows of dies, guide means for moving the plates along a closed loop path coplanar with the plates, the path including two straight, side-by-side main sections and two minor sections disposed between the main sections and extending at least partway along a semicircular arc, filling and shake-out stations, and chilling means acting on the dies, the minor sections of the flat die travel path defining areas of intervention on the dies and being engaged by at least the shake-out station.

6 Claims, 4 Drawing Sheets

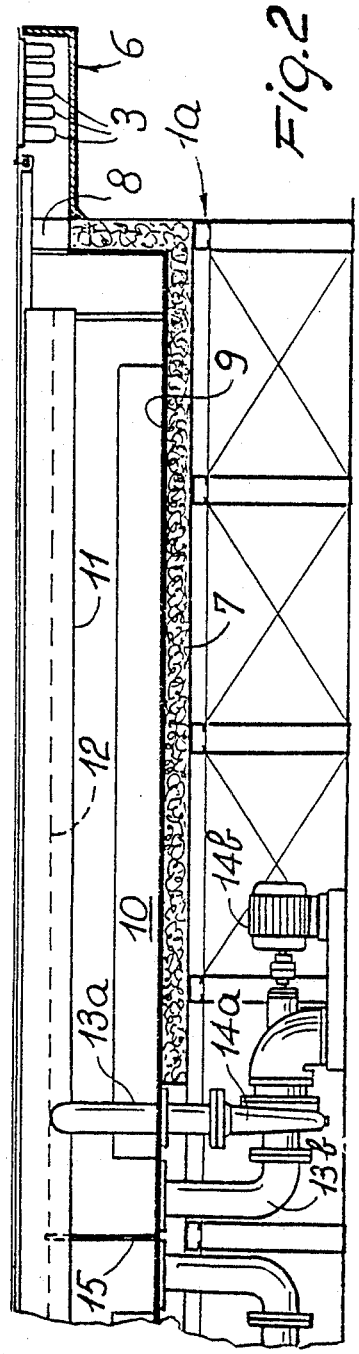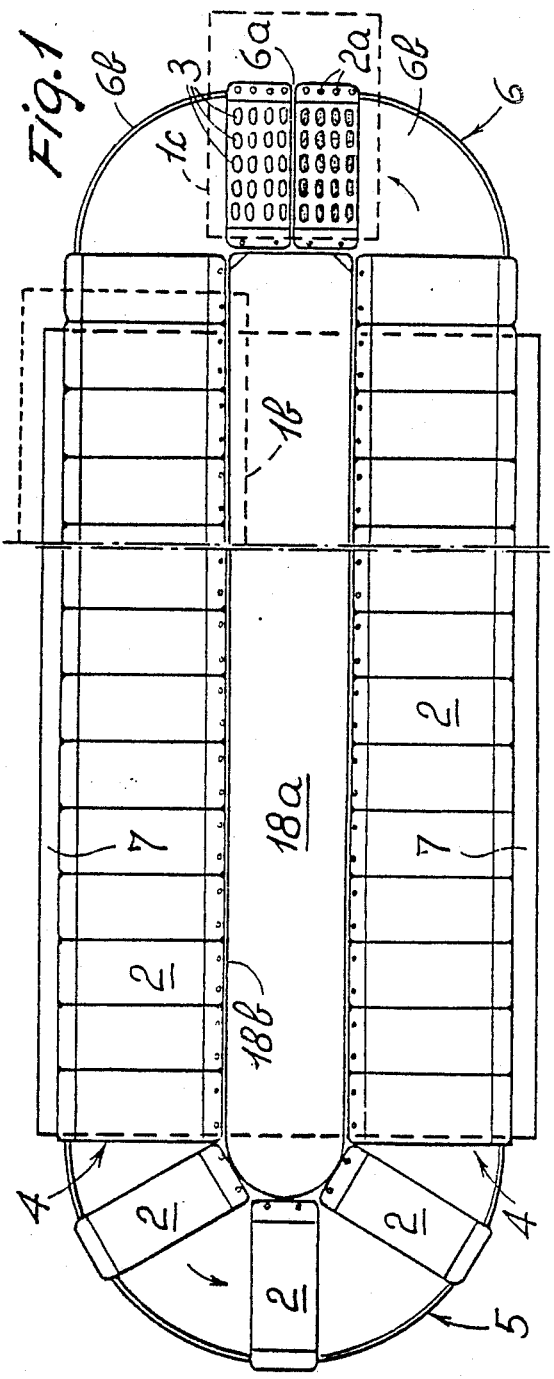

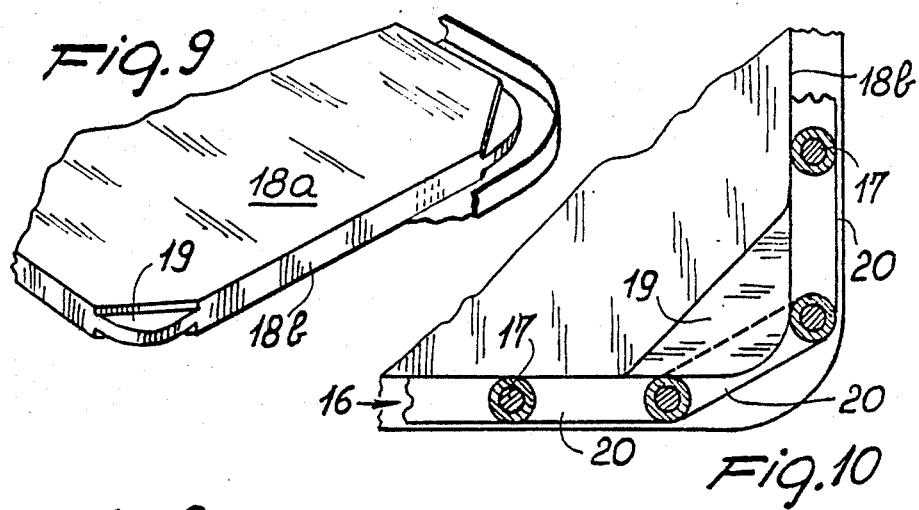
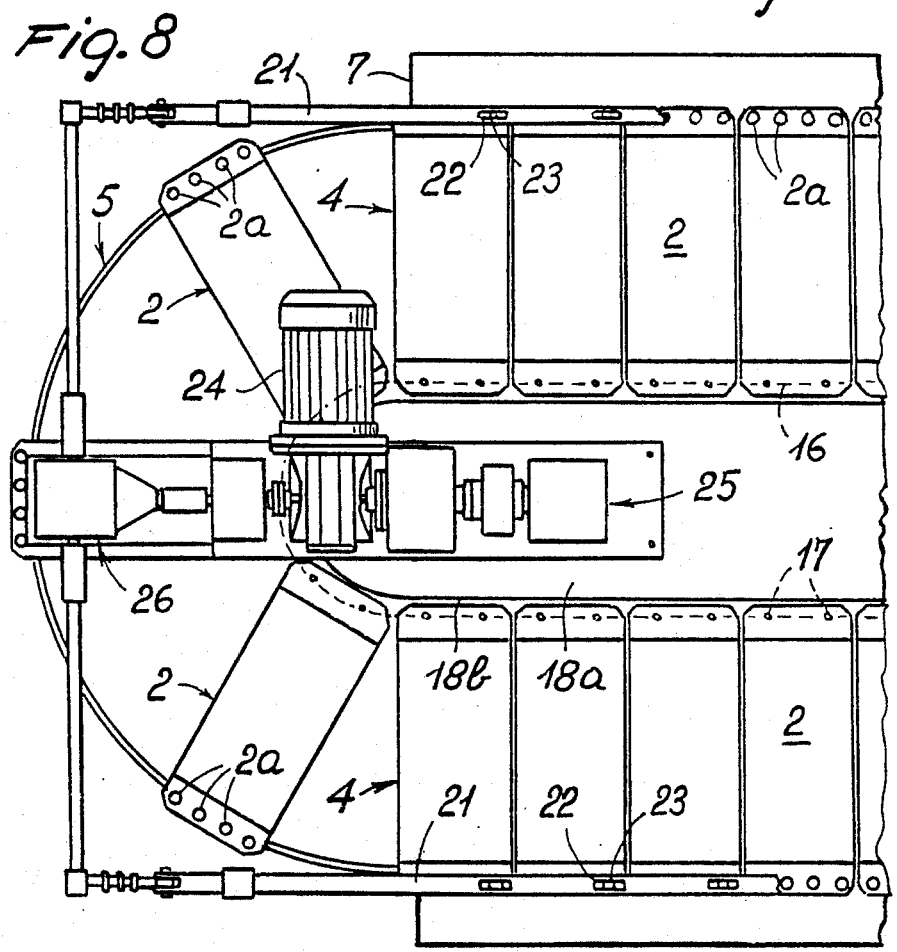

CLOSED LOOP SYSTEM FOR MAKING ICE CONFECTIONS HAVING A HOLDING STICK EMBEDDED THEREIN

BACKGROUND OF THE INVENTION

The invention relates to the technical field of industrial food processing systems, and specifically to a closed loop system for making ice confections of the kind also referred to as "popsicles", having a holding stick embedded therein.

As is known, industrial plant systems for making ice confections, such as ice creams and ice candies molded around a holding stick, fall within two general types, namely: circular systems and linear systems.

In circular type systems, the dies or molds wherein the ice confections are formed are associated with large rigid plates in the shape of annular segments. Each plate carries several rows of dies, depending bucket-like from the bottom side of the plate, and all the plates are set close against one another to form an unbroken flat annulus lying on a horizontal plane and being advanced stepwise. Arranged below the annulus are means of chilling the dies, and work stations are provided all around the outer rim of the annulus, such as filling stations whereat the dies are first filled with appropriate liquids or custards and then, after the latter have been chilled to a somewhat harder consistency, fed in with the holding sticks, and shake-out stations whereat, on completion of the die chilling step and the liquids or custards setting to a solid hard consistency, the ice confections are taken out of the dies.

A significant drawback of such systems stems from their overall size. The area inside the annulus formed by the dies cannot be utilized because it lies practically out of reach, and all the work stations are to be located outwards from the broad outer rim of the annulus.

On the other hand, virtually all of the plate travel path can thus be utilized to chill the dies and for the die filling and shake-out steps, and the large-size plates simplify the system layout as well as the assembly and maintenance operations. As a result, such systems afford a high degree of efficiency and high production rates.

Linear systems are more compact. The dies travel along a path defined by two superimposed linear sections connected to each other by two semicircular end sections, and the work stations may be located at the system periphery as desired.

These system dies are laid in rows over a large number of battens or strips having a much reduced length along their direction of movement, thereby forming together a flexible band which remains unbroken even while travelling along the curved sections.

Despite such benefits, linear systems have not supplanted the circular ones mainly on account of the serious drawback that only the upper straight section can be substantially utilized therein for all the ice confection making operations of die filling, chilling, and shaking out. It follows that the useful chilling section is made shorter, thus lowering the production rate.

Despite their above-mentioned drawbacks, both circular and linear type systems are widely used, also because of the cited travel path and shape combinations of the plates or strips avoiding problems from cold losses by virtue of the various plates or sticks being set close together in an unbroken configuration, whilst the dies, which must be properly positioned and arranged at all times, may be driven in a simple and accurate fashion to enable operation of the filling and shake-out stations acting on the individual dies.

With such systems, the dies can be driven and positioned accurately because the plates or strips are held close together and form continuous snugly fitted bands which are free from oscillations and can be easily driven and trained.

Some attempts at devising systems which could obviate the cited drawbacks confirm that such drawbacks have a marked influence in the specific field of icecream makers and that they are quite difficult to remedy. Reference may be had in this respect to U.S. Pat. No. 4,352,830, which teaches the use of thin strips, each with two rows of dies, guided along two coplanar, side-by-side linear path sections. Switching from one section to the other takes place by a sideways movement of the strips being performed by changing the strip leading side in the direction of advance and shifting the strips to a direction at right angles to their former direction of movement.

Only one strip can be switched from one linear section to the other. Furthermore, in the two linear sections the strips have oppositely set leading sides in the direction of advance.

With this system, switching the strips from one linear section to the other is a critical and complex step, switching of the strips being an operation to be carried out on the fly not to slow the strip motion, given that only one strip is allowed to perform a change of a lane at a time. This condition forbids the use of large size plates, each carrying several dies. Further, the members for controlling the movement of the strips along one linear section are quite separate from those for the other section.

It should be also considered that all the end sections of both linear sections cannot be used with this system for any of the cited filling, chilling, and shake-out steps, the end sections being reserved for said strip change of lane.

SUMMARY OF THE INVENTION

This being the situation, it is the general object of the invention to provide a novel closed loop system which can substantially eliminate the drawbacks of prior systems while retaining their virtues.

Within this general object, it is an important object of the invention to provide a system wherein the dies can be moved and positioned with the utmost accuracy.

A not least object is to provide a system with a simple construction but high efficiency which can also employ plates of simple shape and large size.

These objects are substantially achieved by a closed loop system for making ice confections having a holding stick embedded therein, comprising:
  dies for said ice confections;
  rigid plates, each supporting plural rows of said dies;
  guide members effective to move said plates and defining together with said plates a closed loop path substantially coplanar with said plates and having
    two straight, side-by-side main sections; and
    two minor sections disposed between said main sections and extending at least partway along a circular arc; said system further comprising:
  at least one station for filling said dies, located in said path;

means of chilling said dies, located at least at both said main sections of said path; and a station whereat said ice confections are shaken out and located at either of said minor path sections, said minor sections defining work and continuation areas with respect to said straight main sections.

BRIEF DESCRIPTION OF THE DRAWINGS

Further features of the invention will become apparent from the description of a preferred embodiment of a closed loop system, shown in the accompanying drawings, where:

FIG. 1 is a simplified plan view showing diagramatically the system general layout;

FIG. 2 is a partsectional elevation view of one portion of the inventive system, showing the layout of the system in the longitudinal direction;

FIG. 8 shows, in plan view, the same members as in FIG. 5 but applied to the system; and FIGS. 9 and 10 show, partly in full view and partly in section, perspective and plan views, respectively, of some system members in separate positions.

DESCRIPTION OF THE PREFERRED EMBODIMENT OF THE INVENTION

Figure 3:
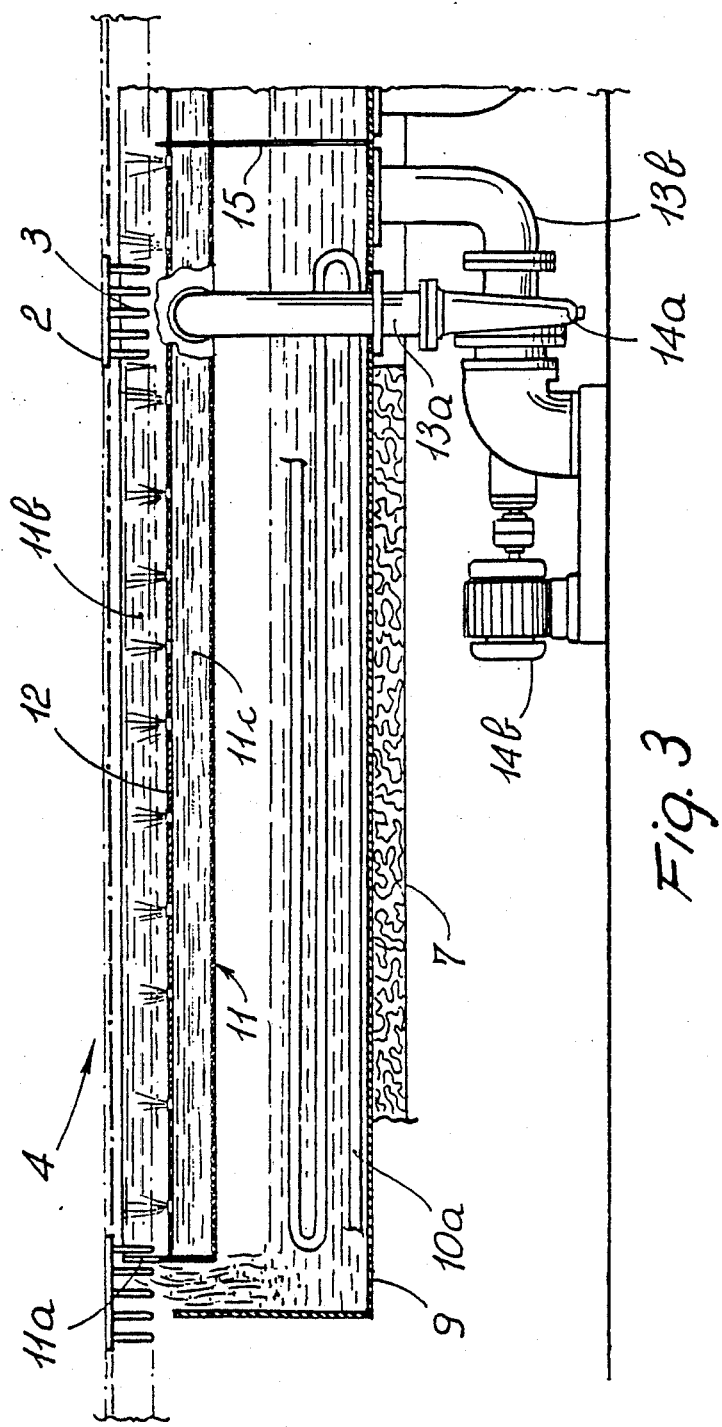
FIG. 3 shows, mainly in section, a further portion of the system, to bring out the longitudinal layout of some of the system members.
Figure 4:
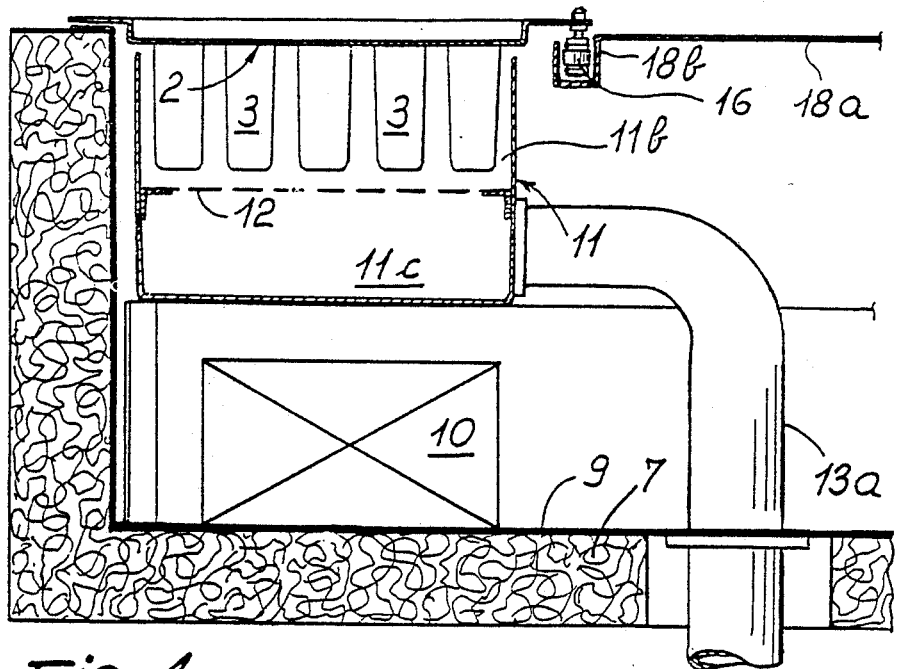
FIG. 4 is a fragmentary cross-sectional view showing in detail some of the system members.
Figure 6:
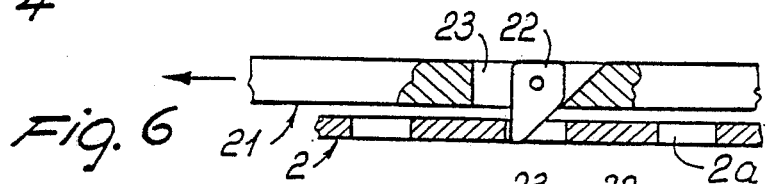
FIGS. 6 and 7 show two different stages of the operation of a pusher bar already shown in FIG. 5.
Figure 7:
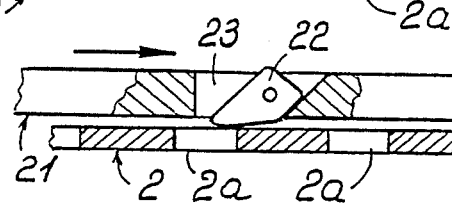

With reference to the cited drawing figures, the system of this invention comprises, as shown particularly in FIG. 1, a platform or frame 1a on which rigid plates 2 are placed which have a rectangular shape in plan view. Made rigid with the plates 2 are dies 3, and each plate 2 has plural rows of dies 3; in the example shown, there are four rows of dies 3 per plate 2.

The plates 2 are movable in a closed loop adjacent to work stations such as, in particular, filling stations 1b and shake-out stations 1c, shown diagramatically in FIG. 1. The closed loop formed by the plates 2 has two straight main sections 4 which extend side-by-side and parallel with each other, and two minor sections which interconnect the main sections 4 and consist, in the embodiment shown, of a first minor section 5 with a semicircular configuration and a second minor section 6 including a substantially straight middle portion 6a and two end portions 6b which are rounded and connect the middle portion 6a to the two main sections 4.

The shake-out station 1c is advantageously placed at the middle portion 6a of the second minor section 6. The first minor section 5 includes, in the embodiment shown, no work stations, although these may be provided especially if the first minor section is shaped like the second minor section 6.

The main sections 4 are at the same level as and substantially coplanar with the plates 2 and the various filling stations 1b are located at these main sections 4.

Furthermore, the main sections 4 overlap a thermally insulative case 7 which is raised off the floor. The case 7 has openings 8 at two opposed ends to allow the plates 2 to move from the main sections 4 to the minor sections 5 and 6 located outwardly of the case 7.

The means of chilling the dies 3 are also placed at the two main sections 4. Said chilling means comprise a liquid coolant which acts directly on the dies or molds 3. This liquid coolant may be of any type, e.g. a conventional "brine" or calcium chloride solution.

A liquid coolant collection and cooling tank 9 is provided in contact with the case 7.

The liquid coolant is cooled by means of an evaporator 10 having pipe coils 10a dipped into the liquid coolant and containing an appropriate refrigerating fluid. The evaporator 10 is placed within the tank 9 and forms a part of a refrigerating system known per se.

The liquid coolant flows into the tank 9 by gravity from coolant supply trays 11 located close to the top of the case 7 adjacently the dies 3. The trays 11 define a conveyance channel for the liquid coolant to flow through the spaces unoccupied by the dies 3 in a parallel direction to the direction of lay of the main sections 4. At the ends of the main sections the trays 11 are terminated with open ends 11a through which the liquid coolant can drop into the underlying tank 9.

The trays 11 are divided into two superimposed portions by a grid 12: an upper portion 11b defining the flow channel proper, and a lower portion 11c into which the coolant is made to flow from first pipes 13a. As shown in FIGS. 2 and 3, the first pipes 13a are connected to pumping units comprising pumps 14a and their respective electric motors 14b, which draw the liquid coolant directly from the bottom of the tank 9 through second pipes 13b.

The FIGS. 2 and 3 also show how the tank 9 and the trays 11 are crossed by a partition 15 defining substantially a middle cross wall which subdivides the chilling means into two groups which are alike and partially independent of one another, being each provided with an evaporator, said pumping units, and said pipes. This enables temporary deactuation, where required, of just some of the system chilling means, and selective intervention on just any parts of the system, thus making any interventions of the operators simpler and quicker.

Guide members are provided for the rigid plates 2 which comprise a drive chain 16 having pins 17 and links 20 and being of the endless type arranged to engage with each plate 2 at the side thereof which lies at all times inboard of the system. The engaging points between the drive chain 16 and the plates 2 are located at the pins 17 of the chain. These pins are guided by a side ledge 18b located on the inboard side of the drive chain 16.

The side ledge 18b is defined by the edges of a cover 18a overlying that area of the system which extends between the main sections 4. Said side ledge 18b has straight portions the main sections 4 and the middle portion 6a of the second minor section 6, a rounded portion flanking the minor section 5, and rounded-edge portions flanking the end portions 6b of the second minor section 6.

The rounded-edge portions have cutouts 19 effective to make them thinner, as shown in FIGS. 9 and 10, in order to allow the links 20 of the drive chain 16 to set along chords of the elbows or arcs followed by the pins 17.

The cited guide members further comprise two pusher bars 21 lying parallel with the main path sections 4 of the plates 2 and acting on holes 2a in the plates 2 which are formed at the outboard side of the plates extending remotely from that engaged by the drive chain 16.

The pusher bars 21 are movable of reciprocating motion and engage with the plates 2 through a ratchet mechanism defined by teeth 22 which can be swung out of the way into recesses 23 formed within the pusher bars 21. The teeth 22 tend to set themselves naturally out by gravity force, and are shaped and positioned to only act in the direction of advance of the plates 2.

Figure 5:
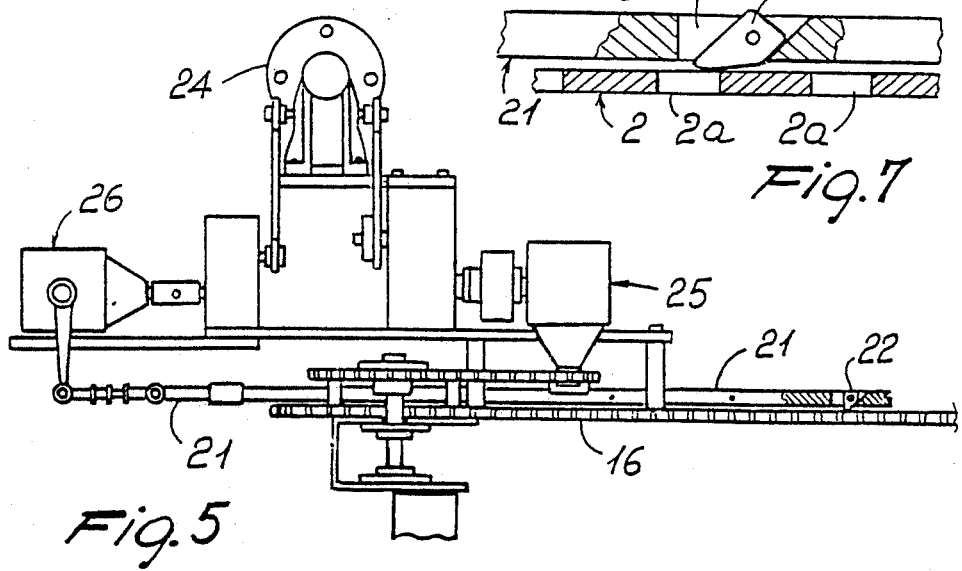
FIG. 5 shows, in elevation and separately, some of the plate advancing members.

FIGS. 5 and 8 show how both the motion for the drive chain 16 and the motion for the pusher bars 21 is taken off a single motive member 24 located on the same side as the first minor section 5. The motive member 24 drives the drive chain 16 through a suitable reduction gear and intermitter 25 which converts the continuous rotary motion of the motive member 24 into an intermittent rotary motion, connection to the pusher bars 21 being provided by an oscillator unit 26 adapted to impress on the pusher bars the same linear velocity as the drive chain 16. The members 25 and 26 are known per se.

This system operates as follows.

The rigid plates 2 mainly travel along linear sections, are of a large size, and have a merely rectangular shape, and the dies 3 are subjected to cooling over the largest part of their travel path. Thus, the system is made compact, with a small number of components and a high production capability.

The plates 2 come off their positions of intimate contact with one another at the minor sections 5 and 6, whereat they arrange themselves substantially radially. This results neither in a loss of cold nor in inaccurate control of the plate movements and positions, because the chilling means are only arranged at the straight main sections 4, whereat the plates 2 would contact one another, whilst the combination formed by the drive chain 16 and the pusher bars 21 afford simple and accurate control over the plates 2.

The pusher bars become operative at the main sections 4, where utmost accuracy is required in positioning the plates 2 and they do not encumber the construction. The control members for the pusher bars and the drive chain are located at the remote end of the system from that engaged by the shake-out station 1c.

The shake-out station, located at the minor section 6 of the plate 2 path, leaves the main sections 4 fully available for cooling purposes and also makes one such minor section usable. This location of the shake-out station 1c is facilitated by the presence of the straight middle portion 6a and by the technical solution brought out in FIGS. 9 and 10, in connection with bending of the drive chain 16.

The inner construction of the system is also specially simple and workable because of the trays 11, the collecting and cooling tanks placed below the trays 11, transfer of the liquid coolant by mere gravity from the trays 11, and the partition 15 subdividing the system into two parts substantially independent of each other.

We claim:

1. A closed loop system for making ice confections having a holding stick embedded therein, comprising:
   dies for said ice confections;
   rigid plates, each supporting plural rows of said
   guide members effective to move said plates and defining together with said plates a closed loop path substantially coplanar with said plates and having:
      two straight, side-by-side main sections; and
      two minor sections disposed between said main sections including:
         a first minor section extending along a semicircle; and
         a second minor section having a straight middle portion and end portions connecting said middle portion to said main sections;
   a thermally insulating case extending below said main path sections, said plates in said main path sections realizing an upper cover of said case;
   at least one station for filling said dies, located at said straight main sections, and a station whereat said ice confections are shaken out, located at said middle portion of said second minor section;
   and means for chilling said dies located at said main sections.

2. A closed loop system for making ice confections having a holding stick embedded therein comprising:
   dies for said ice confections;
   rigid plates and each supporting plural rows of said dies;
   guide members effective to move said plates and defining together with said plates a closed loop path substantially coplanar with said plates and having:
      two straight, side-by-side main sections; and
      two minor sections disposed between said main sections including:
         a first minor section extending along a semicircle; and
         a second minor section having a straight middle portion and end portions connecting said middle portion to said main sections;
   a thermally insulating case extending below said main path sections, said plates in said main path sections realizing an upper cover of said case;
   at least one station for filling said dies, located at said straight main sections, and a station whereat said ice confections are shaken out, located at said middle portion of said second minor section;
   and means of chilling said dies located at said main sections;
   said guide members comprising:
      a drive chain engaging all said plates and extending along both said main sections and said minor sections, said drive chain having chain pins and links and being of the endless type to engage with each of said plates at least two spaced-apart locations;
      a side ledge for guiding said chain pins located on one side of said chain having:
         straight portions, flanking said main sections and said middle portion;
         a rounded portion, flanking said first minor section;
         rounded-edge portions flanking said end portions; and
         cutouts formed in said rounded-edge portions of said side ledge, at said cutouts said chain pins being guided by said side ledge along arcuate paths and said chain links arranging themselves along chords of said arcuate paths followed by said chain pins.

3. A system according to claim 2, wherein said guide members further comprise at least one pusher bar parallel with said main path sections and acting on outboard sides of said plates extending remotely from those engaged by said chain, said at least one pusher bar being reciprocable, and a ratchet mechanism engaging at least one pusher bar with said plates and acting in the direction of advance of said chain, said ratchet mechanism including teeth adapted to be swung out of the way into a recess formed within said at least one pusher bar.

4. A system according to claim 3, wherein two pusher bars are provided which lie parallel to each other, each said pusher bar engaging with one of said main path sections, and wherein a single motive member is provided to simultaneously drive said drive chain and said two pusher bars.

5. A closed loop system for making ice confections having a holding stick embedded therein, comprising:
   dies for said ice confections;
   rigid plates, each supporting plural rows of said dies;
   guide members effective to move said plates and defining, together with said plates, a closed loop path coplanar with said plates and having:
      two straight, side-by-side main sections; and
      two minor sections disposed between said main sections and extending at least partway along a circular arc;
   at least one station for filling said dies, located in said path, and a station whereat said ice confections are shaken out, located at either of said minor path sections;
   a thermally insulating case raised off the floor and extending below said main path sections;
   and means of chilling said dies located at both said main sections, where a liquid coolant is provided in which said dies are dipped at least partially, said means of chilling said dies comprising:
      trays for directing said liquid coolant toward said dies, located at both said main sections, in said case;
      grids for distributing said liquid coolant to said dies, said grids being disposed substantially in an upper portion of said trays and in contact with said coolant;
      collecting and cooling tanks for said liquid coolant located in said case trays along both said main sections;
      at least one pumping unit for circulating said liquid coolant, placed below said case; and
      hydraulic connection pipes engaging said tanks, said pump unit and said trays, said pipes through-penetrating said case.

6. A system according to claim 5, wherein a cross-partition extends transversely to said main sections within said tanks and said trays to split said chilling means into two groups each provided with one said pumping unit and said pipes.

* * * * *